W. D. MANN & W. B. RELTH.
STEERING DEVICE FOR TRACTORS.
APPLICATION FILED OCT. 30, 1915.
1,178,740.
Patented Apr. 11, 1916.
2 SHEETS—SHEET 2.
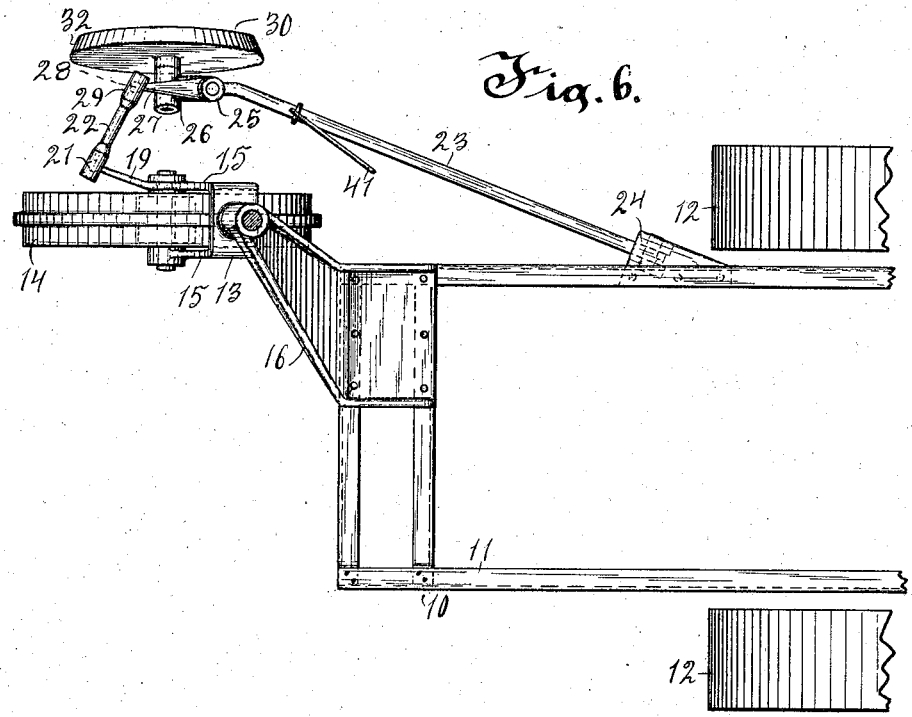
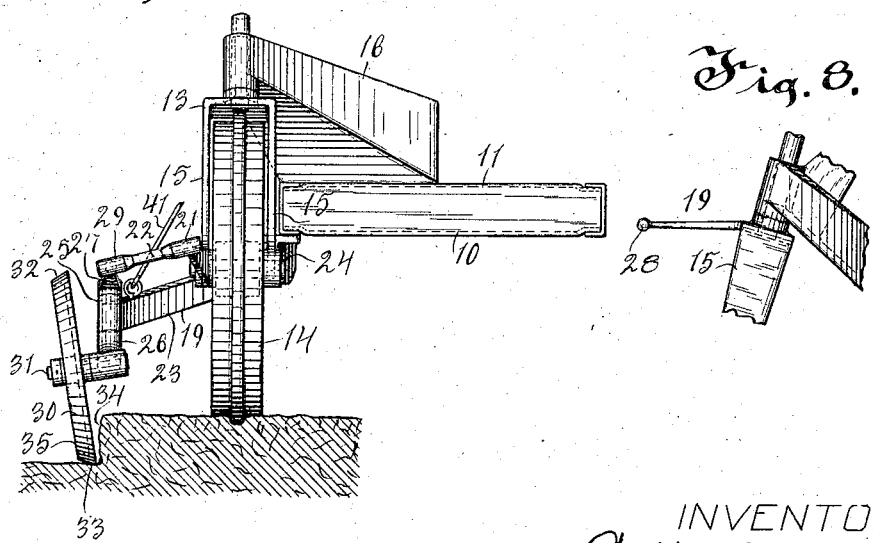
INVENTOR
Walter D. Mann
William B. Relth
By Morsell, Keeney & French
ATTORNEYS

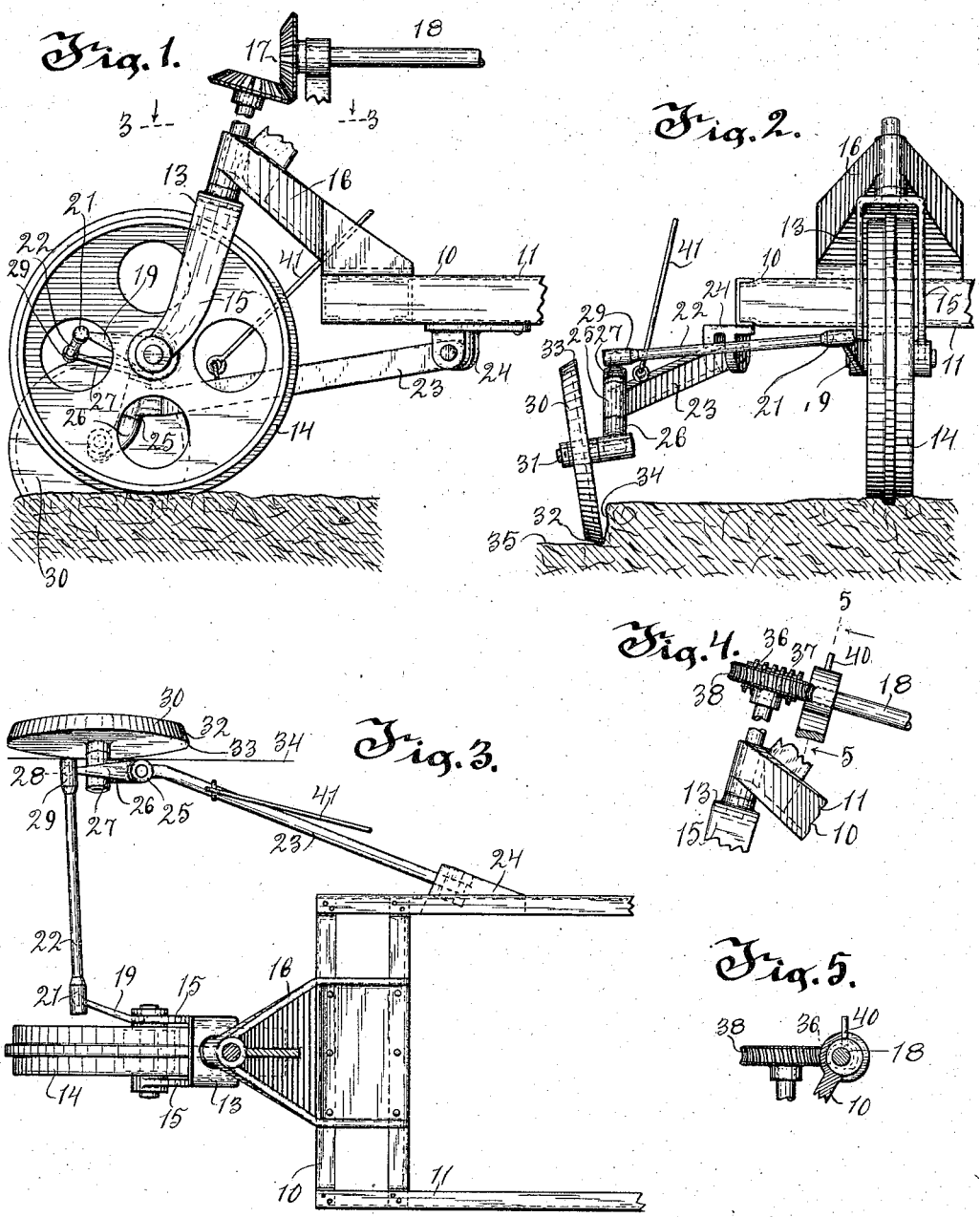

UNITED STATES PATENT OFFICE.

WALTER D. MANN AND WILLIAM B. RELTH, OF MILWAUKEE, WISCONSIN; SAID RELTH ASSIGNOR TO SAID MANN.

STEERING DEVICE FOR TRACTORS.

1,178,740.      Specification of Letters Patent.      Patented Apr. 11, 1916.

Application filed October 30, 1915. Serial No. 58,744.

*To all whom it may concern:*

Be it known that we, WALTER D. MANN and WILLIAM B. RELTH, citizens of the United States, and residents of Milwaukee, in the county of Milwaukee and State of Wisconsin, have invented new and useful Improvements in Steering Devices for Tractors, of which the following is a description, reference being had to the accompanying drawings, which are a part of this specification.

This invention relates to improvements in steering devices for tractors more particularly adapted for farming purposes.

It is one of the objects of the present invention to provide a steering device which may be attached to the steering wheel of a tractor used for pulling plows and which will automatically steer the tractor in a line parallel to the furrow in which a part of the device travels.

A further object of the invention is to provide a steering device for tractors which will permit the tractor to be steered manually when desired.

A further object of the invention is to provide a steering device which is yieldingly connected to the tractor to permit traveling over uneven ground and is also connected in a manner to resist abnormal shocks and strains.

A further object of the invention is to provide a steering device for tractors which is of very simple construction and is well adapted for the purpose desired.

With the above and other objects in view the invention consists of the improved steering device for tractors and its parts and combinations as set forth in the claims and all equivalents thereof.

In the accompanying drawings in which the same reference characters indicate the same parts in all of the views: Figure 1 is a side view of the forward end portion of a tractor provided with the improved steering device; Fig. 2 is a front view thereof; Fig. 3 is a horizontal sectional view thereof taken on line 3—3 of Fig. 1; Fig. 4 is a detail view of a modified form of structure controlling the manually operated steering means; Fig. 5 is a vertical sectional detail view taken on line 5—5 of Fig. 4 of the part shown in Fig. 4; Fig. 6 is a top view of the steering device shown in connection with a slightly modified form of tractor; Fig. 7 is a front view thereof; and Fig. 8 is a side view of another modified form of tractor.

Referring to the drawings the numeral 10 indicates the front end portion of a tractor used for hauling plows. The tractor in part comprises the frame 11, the traction wheels 12, the forked steering head 13 and the steering wheel 14 mounted between the legs 15 of said steering head. The tractor is preferably of the three wheel type and the steering head 13 is revolubly mounted in the forwardly and upwardly projecting bracket 16 and is controlled manually by a gearing connection 17 and a rod 18 which extends to the rear portion of the frame. One of the forks of the steering head is provided with a forward projection 19 having a rounded end portion 20 on its outer end which is engaged by the inner socketed end 21 of a connecting rod 22 to form a ball and socket connection therebetween.

A steering beam 23, pivoted at its inner end to an eared bracket 24 which is bolted to the side of the tractor frame, extends outwardly and forwardly therefrom at an oblique angle and at its outer end is provided with a vertically extending tubular portion 25. A wheel frame member 26 extends through and has a bearing in the tubular portion 25 and at its upper end carries a forwardly projecting steering arm 27, the outer rounded end 28 of which is engaged by the outer socketed end 29 of the connecting steering rod 22 so that any turning movement of the wheel frame member will be transmitted to the steering fork of the tractor and cause approximately a corresponding movement of the steering fork.

A furrow wheel 30 positioned on the outer side of the wheel frame member 26 is journaled on a short axle 31 which projects outwardly and downwardly from the wheel frame member 26. The peripheral edge portion 32 of the wheel is tapered outwardly to cause the inner edge portion 33 thereof to more closely follow the inner line of land side edge 34 of the furrow 35.

In the form of tractor shown in Figs. 1, 2 and 3 the steering wheel 14 is positioned in advance of the central portion of the frame of the tractor whereas in Figs. 6 and 7 the steering wheel is positioned in advance of one side of said frame. The steering devices of both of these forms are the same with the exception that in the last mentioned tractor frame the connecting rod 22 is of less length than in the other frame.

In the modified form shown in Figs. 4 and 5 a worm and worm wheel gearing 36 is substituted for the bevel gears for manually controlling the steering of the tractor. When the tractor is automatically steered the worm 37 is swung out of mesh with the worm wheel 38 by means of the eccentric bearing 39 through which the steering rod 18 extends and has its bearing. The eccentric bearing is turned by means of a handle 40.

In the modified form shown in Fig. 8 the forward projection 19' extends from the upper portion of the steering fork of tractor and connecting rod 22 is connected thereto in the same manner before described.

A rope or other means 41 is connected to the steering beam and extends to the frame of the tractor and may be operated in any manner desired to lift the furrow wheel out of the furrow when it is desired to change to the next furrow or to travel on the road.

From the foregoing description it will be seen that the steering device for tractors will automatically control the steering of the tractor steering wheel and guide the tractor in a line parallel to the furrow in which the furrow wheel travels. The tractor may also be steered in the ordinary manner if desired. In running upon the road the steering device may be swung upwardly to clear the road.

Having thus described the invention, what is claimed as new is:

1. The combination with a tractor having a steering head, a steering device therefor comprising a beam member pivotally connected at its inner end to the tractor frame and projecting forwardly and outwardly therefrom and at its outer end provided with a vertically extending bearing opening, a furrow wheel frame journaled in the bearing opening and having an arm projecting outwardly therefrom, a furrow wheel journaled on the wheel frame, and a means directly pivotally connected to the wheel frame arm and also to the steering head of the tractor frame.

2. The combination with a tractor having an arm projecting from the steering head of the tractor, a steering device therefor comprising a beam member pivotally connected at its inner end to the tractor frame and projecting forwardly and outwardly therefrom at an oblique angle and at its outer end provided with a vertically extending bearing opening, a furrow wheel frame journaled in the bearing opening and having an axle projecting outwardly and downwardly from its lower end, a furrow wheel journaled on the axle, an arm mounted on the upper end of the wheel frame, and a connecting rod extending approximately at right angles to the direction of travel of the tractor and having a universal connection with the outer end of the arm of the wheel frame and the outer end of the arm of the steering head of the tractor.

3. The combination with a tractor having a front steering fork and a steering wheel journaled therein, a steering device therefor comprising a beam member pivotally connected at its inner end to the tractor frame and projecting forwardly and outwardly therefrom at an oblique angle and at its outer end provided with a vertically extending bearing opening, a furrow wheel frame journaled in the bearing opening and having an axle projecting outwardly therefrom, a furrow wheel journaled on the axle, an arm mounted on the upper end of the wheel frame and projecting therefrom, and a connecting rod extending approximately at right angles to the direction of travel of the tractor and having a universal connection at one end with the outer end of the arm of the wheel frame and at its other end having a universal connection with the steering fork of the tractor.

4. The combination with a three wheel tractor having a front steering fork in which one of the wheels is journaled, a steering device therefor, comprising an arm projecting forwardly from the steering fork, a beam member projecting outwardly from the frame of the tractor, a furrow wheel frame revolubly connected to the outer end of the beam member and having an outwardly projecting axle, a furrow wheel journaled on the axle, an arm projecting forwardly from the wheel frame, and a connecting rod extending approximately at right angles to the direction of travel of the tractor and having a universal connection with both the arm of the wheel frame and the arm of the steering fork.

5. The combination with a three wheel tractor having a front steering fork in which one of the wheels is journaled, a manually operable means for steering the tractor comprising a steering rod mounted on the frame of the tractor and having a geared connection with the steering fork, and an automatic means for steering the tractor, comprising a beam member projecting outwardly from the tractor frame, a wheel frame revolubly mounted on the outer end of the beam member, a furrow wheel journaled on the wheel frame, an arm projecting from the wheel frame, an arm projecting from the tractor steering fork, and a connecting rod having universal connections with both the wheel frame arm and the steering fork arm.

In testimony whereof, we affix our signatures.

WALTER D. MANN.
WILLIAM B. RELTH.